(12) United States Patent
Consonni et al.

(10) Patent No.: US 8,265,437 B2
(45) Date of Patent: Sep. 11, 2012

(54) TELECOMMUNICATION CABLE EQUIPPED WITH MICROSTRUCTURED OPTICAL FIBRES

(75) Inventors: Enrico Consonni, Milan (IT); Franco Cocchini, Salerno (IT); Antonio Collaro, Torre del Greco (IT); Antonio Adigrat, Battipaglia (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 12/226,901

(22) PCT Filed: Sep. 19, 2008

(86) PCT No.: PCT/EP2008/007922
§ 371 (c)(1), (2), (4) Date: Oct. 31, 2008

(87) PCT Pub. No.: WO2010/031419
PCT Pub. Date: Mar. 25, 2010

(65) Prior Publication Data
US 2011/0170836 A1 Jul. 14, 2011

(51) Int. Cl.
G02B 6/44 (2006.01)
(52) U.S. Cl. .................................................. 385/102
(58) Field of Classification Search .................. 385/102
See application file for complete search history.

(56) References Cited

U.S. PATENT DOCUMENTS

| 5,333,229 | A | * | 7/1994 | Sayegh | 385/102 |
|---|---|---|---|---|---|
| 7,397,991 | B1 | | 7/2008 | Register | |
| 2004/0086242 | A1 | * | 5/2004 | McAlpine et al. | 385/102 |
| 2004/0156609 | A1 | * | 8/2004 | Lanier et al. | 385/128 |
| 2005/0013566 | A1 | * | 1/2005 | Storaasli et al. | 385/113 |
| 2006/0159407 | A1 | * | 7/2006 | Kachmar | 385/102 |
| 2007/0098339 | A1 | * | 5/2007 | Bringuier et al. | 385/106 |
| 2008/0304798 | A1 | | 12/2008 | Pavan et al. | |
| 2009/0074364 | A1 | | 3/2009 | Bringuier et al. | |

FOREIGN PATENT DOCUMENTS

WO WO 2005/022230 A1 3/2005
WO WO 2009/016424 A1 2/2009

OTHER PUBLICATIONS

International Search Report from the European Patent Office, International Application No. PCT/EP2008/007922, Jul. 7, 2009.
"Generic Requirements for Premises Fiber Optic Cable," Bellcore, Generic Requirements, GR-409-CORE, Issue 1, May 1994, 78 pgs.

* cited by examiner

Primary Examiner — Ryan Lepisto
Assistant Examiner — Robert Tavlykaev
(74) Attorney, Agent, or Firm — Finnegan, Henderson, Farabow, Garrett & Dunner, L.L.P.

(57) ABSTRACT

Telecommunication cable comprising at least one microstructured optical fiber comprising a core region and a cladding region surrounding the core region, the cladding region comprising an annular void-containing region comprised of randomly arranged voids, the core region including doped silica to provide a positive refractive index relative to pure silica; and at least one protecting layer provided around said optical fiber, the protecting layer being made of a polymeric material having a low ultimate elongation.

13 Claims, 6 Drawing Sheets

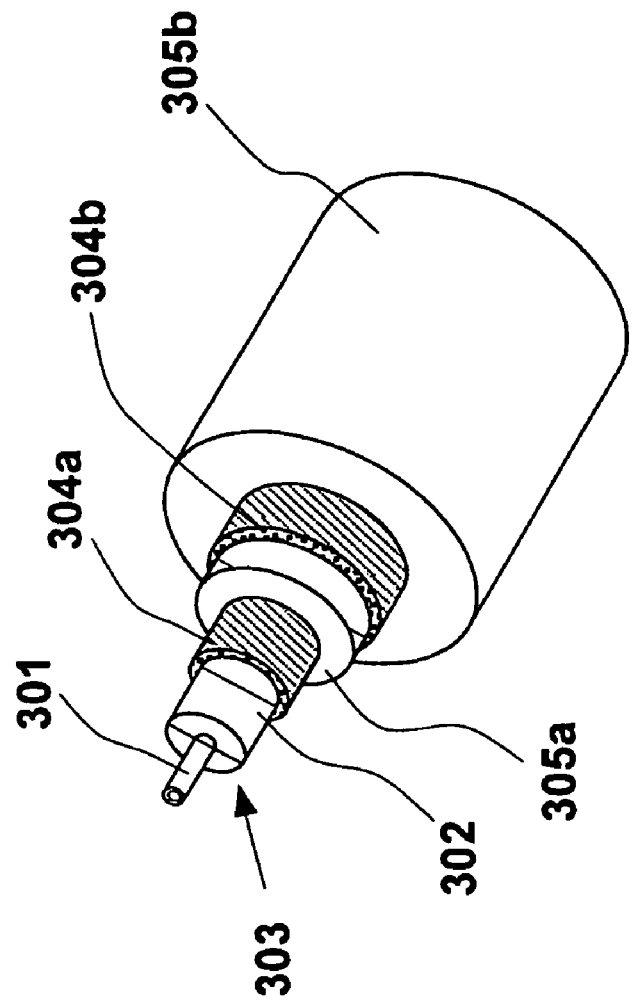
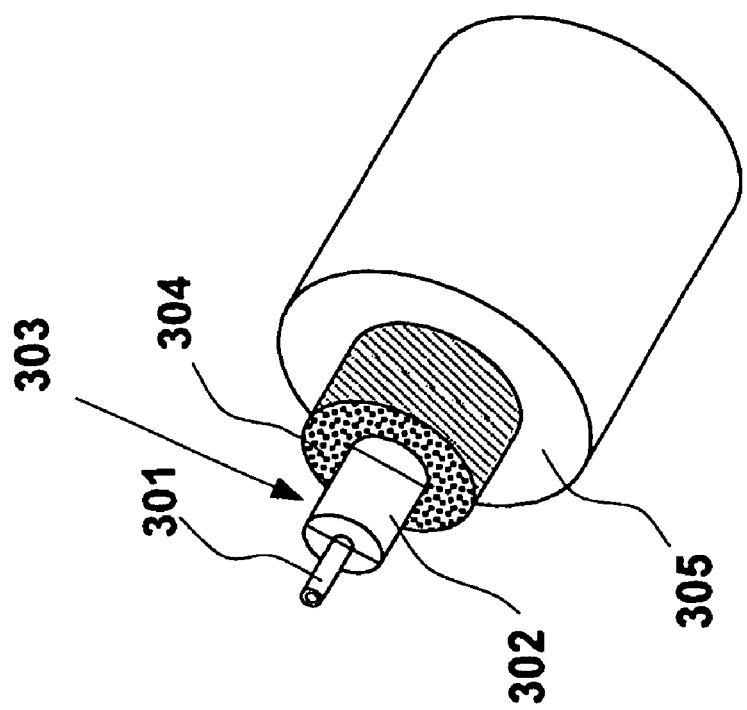
FIG. 3b
FIG. 3a

TELECOMMUNICATION CABLE EQUIPPED WITH MICROSTRUCTURED OPTICAL FIBRES

CROSS REFERENCE TO RELATED APPLICATION

This application is a national phase application based on PCT/EP2008/007922, filed Sep. 19, 2008.

BACKGROUND OF THE INVENTION

1. Field of the Invention

The present invention relates to a telecommunication cable equipped with at least one optical fibre. In particular, the present invention relates to a telecommunication cable equipped with at least one protecting layer optical fibre, especially suitable for indoor installations.

2. Description of the Related Art

An optical fibre generally comprises a core surrounded by a cladding, said core and cladding being preferably made of glass, and at least one coating. The combination of core and cladding is usually identified as "optical waveguide". Usually, the coatings of the optical waveguide are two. The coating directly contacting the optical waveguide is called "first coating" or "primary coating", and the coating overlying the first one is called "second coating" or "secondary coating". Typically, said first and second coatings are made of a polymeric material, such as a UV-curable acrylate polymer.

Certain applications require the optical fibre to be further coated by a buffer coating provided over the at least one coating.

When said buffer coating is provided substantially in contact with the at least one exterior coating it is said to be a "tight buffer". When said buffer coating is in the form of a tube having an internal diameter larger than the overall external coating diameter (the outer diameter of the optical fibre typically is of 240-250 µm), it is said to be a "loose buffer". Depending on the difference between the fibre outer coating diameter and the buffer inner diameter, a loose buffer can be identified as "loose" or "near tight".

Typically, a buffered optical fibre can be used as semi-finished component to form a cable in association with other components as required by the specific use to which the cable is intended. In some applications, when additional protection is not required, the buffered optical fibre can be used as such to operate as a cable.

Examples of these applications are indoor and premises installations, cable terminations, pigtails, patchcords and, more generally, those applications in which the optical fibre is subjected to repeated mechanical stresses because of recurring installation operations.

Optical fibres having a low-density region disposed around the fibre core, and preferably in the fibre outer cladding, may be tailored to provide robust bend-resistance. Generally, the low density region is an annular region comprising non-periodically, and in general randomly (i.e., irregularly located within the region), distributed holes or voids, to provide a single mode transmission. Herein, the term void may indicate empty holes, air-filled holes or bubbles containing gases trapped within them, and in general a defect having a refracting index significantly smaller than that of the surrounding matrix, and generally having a refractive index equal or close to 1. The pattern of voids leads to an effective lowering of the refractive index.

The above-mentioned type of optical fibres is called "microstructured" optical fibres. Microstructured optical fibres include deliberately-introduced defects, which generally are voids running longitudinally along the fibre axis. These voids may not extend the whole length of an optical fibre.

U.S. Pat. No. 7,397,991 relates to fibre optic cable having at least one optical fibre such as a microstructured bend performance optical fibre disposed within a protective covering. The protective covering such as a buffer layer and/or a jacket uses a bend radius control mechanism for protecting the optical fibre by inhibiting damage and/or breaking of the optical fibre. The jacket material used had a relatively high ultimate elongation (i.e., elongation before breaking) measured according to DIN 53504 (a German measurement standard), thereby providing a highly flexible fibre optic cable design. Jackets for fibre optic cables of the invention have an ultimate elongation that is about 500% or greater such as about 600% or greater, and even about 700% or greater. The PU (polyurethane) jacket material used had an ultimate elongation of about 800% along with a 300% tensile modulus of about 8.0 MPa The patent application PCT/IB2007/002187 relates to a telecommunication cable equipped with at least one optical fibre coated by a tight buffer layer made from a polymeric material having an ultimate elongation equal to or lower than 100% and an ultimate tensile strength equal to or lower than 10 MPa. The combination of features of the polymeric material forming the buffer layer allows to obtain an optical fibre which is effectively protected during the installation operations and during use, and at the same time can be easily stripped by the installer without using any stripping tools, simply by applying a small pressure with his fingertips and a moderate tearing force along the fibre axis.

Applicant has observed that, in an optical fibre with a random-void distribution, the thickness of the void-containing region and the local density of the voids primarily determines the bend resistance of the optical fibre. Notably, bend resistance has been seen to be directly correlated with the product of the local void density and the area of the void-containing region.

The Applicant has faced the problem of providing optical cables particularly suitable for riser and horizontal indoor installations, e.g. in multi-floor buildings, (as known as "fibre-to-the-home" or FTTH application) with the aim of protecting the optical fibres contained therein during both the installation and the operation.

The Applicant noticed that the optical fibre can be subjected to mechanical stress during not only the installation and connection with the premises, for example in the extraction from a riser cable at a certain floor of a building, but also to static fatigue during the operation life, for example because of bending and/or winding in coils.

The Applicant has observed that the optical performance of the fibre is not the only element to be taken into account. When a cable or buffered fibre is bent around a corner for installation within a building or coiled on a small diameter, the fibre housed therein is maintained at the corresponding bending value for the cable life and this permanent deformation status can be source of unexpected mechanical breaks of the fibre (this phenomenon being generally addressed as "static fatigue").

As static fatigue is intended failure of a component as a result of sustaining a heavy, continuous load.

Accordingly, even with fibres showing excellent optical performances in bent conditions, the minimum bending radius should be limited for mechanical reasons.

In addition, the Applicant has observed that bending the cable around relatively sharp corners or winding in small diameter coils would suggest the use of a buffer layer or sheath made of a "soft" material i.e. a material with very high compressibility, (or low elastic modulus); a material having high elongation at break seemed also desirable, both such conditions being usually found in the same material.

However, the Applicant has observed that in some typical uses of a cable housing a microstructured optical fibre a sheath, or a buffer layer, having a high elongation at break and low elastic modulus materials turns out to be a problem.

In particular, during the installation of a cable in a building the operator is in the need of peeling off the sheath or the fibre buffer layer, in order to apply a connector to the fibre, to make a mechanical splice, or a butt welding of the fibre or the like.

In such circumstances, a highly stretchable material would require some special tools to peel of the relevant layer, and an improper use of such tool may result in mechanical stress applied to the fibre.

To the contrary, a relatively stiffer material, with a low elongation at break allows the operator to peel off the buffer layer with the fingers or with a simple tool, with practically no stress applied to the fibre.

SUMMARY OF THE INVENTION

In the above, the Applicant has found that, in order to make an optical fibre or a cable suitable for use in the so-called FTTH applications and enabling both good optical performance and economically effective installation, a number of different properties have to be considered together and the relevant values have to be properly matched and optimized, including low attenuation in bent conditions, ability to resist to static fatigue, ease of installation and connectorization.

Accordingly, it has been found that a convenient cable for FTTH application should include a microstructured optical fibre, protected by a buffer layer or a cable sheath whose elongation at break is comprised in a suitable range enabling bending around relatively sharp edges and, at the same time, enabling manual peeling off of the buffer layer.

In particular, it has been found that a relatively high elongation at break would be of no use in a cable or buffered fibre for FTTH applications, given the fact that the cable or buffered fibre bending conditions never reach the maximum theoretical elongation of 100% and, to the contrary, always remain well below such value.

Therefore, according to a first aspect, the present invention relates to a telecommunication cable comprising at least one microstructured optical fibre and at least one protecting layer provided around said optical fibre, the protecting layer being made of a polymeric material having an ultimate elongation of from 50% to 200%.

The at least one protecting layer according to the invention can be a tight buffer layer.

A tight buffer layer according to the invention is preferably made from a polymeric material having an ultimate elongation equal to or lower than 150%. More specifically the polymeric material of a tight buffer layer for the cable of the invention can have an ultimate elongation of from 70% to 150%.

Advantageously, the cable of the invention is provided with at least two protecting layers, of which one is a tight buffer layer and the other is at least one sheath.

Advantageously, the at least one sheath has an ultimate elongation higher than that of the tight buffer layer.

The at least one sheath according to the invention is preferably made from a polymeric material having an ultimate elongation of from 120% to 200%. More specifically the polymeric material of a sheath for the cable of the invention has an ultimate elongation of from 150% to 200%.

The telecommunication cable of the invention can be provided with at least two sheaths.

Advantageously, at least one reinforcing layer is provided in the cable of the invention. For example, the at least one reinforcing layer is made of at least one material selected from aramid, water-swellable water-blocking material, glass fibre. Advantageously, the at least one reinforcing layer is provided in radially external position with respect to a tight buffer layer.

Advantageously, the at least one reinforcing layer is provided in radially internal position with respect to the at least one sheath. In the case the cable of the invention is provided with more than one sheath, more than one reinforcing layer can be present.

Advantageously, the polymeric material of the protecting layer according to the invention has an ultimate tensile strength of at least 4 MPa. Preferably the polymeric material of the protecting layer according to the invention can have an ultimate tensile strength of at most 15 MPa.

Ultimate elongation and ultimate tensile strength are measured, at 25° C., according to CEI EN 60811-1-1 (2001) standard.

For the purposes of the present description and of the appended claims, with the term "tight buffer layer" it is meant a protective layer surrounding an optical fibre, the internal diameter of the protective layer being substantially the same of the outside diameter of the optical fibre. No appreciable buffer-to-fibre clearance is observed.

It should be noted that the tight buffer layer of the present invention shall not be confused with a so called "buffer tube". A buffer tube typically includes one or more optical fibres disposed within the same, possibly immersed in a water-blocking material (usually grease) which inhibits migration of water which may penetrate into the buffer tube. Moreover, a buffer tube generally has a relatively large inner diameter when compared to the outer diameter of each optical fibre inserted therein, in order to allow the fibre to move freely thereinto.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The tight buffer layer of the optical fibre preferably has a thickness such as to provide a buffered optical fibre with a diameter of from 600 to 1000 μm, more preferably from 800 to 900 μm.

According to a preferred embodiment, the buffer layer has an average strip force, measured according to FOTP/184/TIA/EIA standard (effected with a stripping speed of 10 mm/min) of from 0.10 N/15 mm to 0.50 N/15 mm, more preferably from 0.15 N/15 mm to 0.40 N/15 mm. The buffer layer has a peak strip force measured according to FOTP/184/TIA/EIA standard (effected with a stripping speed of 10 mm/min) of from 1.0 N/15 mm to 3.5 N/15 mm, more preferably from 1.5 N/15 mm to 2.0 N/15 mm.

According to a preferred embodiment, the buffer layer has an average shrinkage, measured after 24 hours at 70° C., of from 3 mm/1000 mm to 15 mm/1000 mm, more preferably from 5 mm/1000 mm to 10 mm/1000 mm The polymeric material forming the at least one protective layer according to the present invention preferably comprises at least one polymer selected from: polyethylene, preferably low density polyethylene (LDPE), very low density polyethylene (VLDPE) or linear low density polyethylene (LLDPE); copolymers of ethylene with at least one $C_3$-$C_{12}$ alpha-olefin and optionally with at least one $C_4$-$C_{20}$ diene; copolymers of ethylene with at least one alkyl-acrylate or alkyl-methacrylate, preferably ethylene/butylacrylate copolymers (EBA); poly-vinylchloride (PVC); ethylene/vinyl acetate copolymers (EVA); polyurethanes; polyether-esters; and mixtures thereof.

The polymeric material may further comprise, in admixture with the at least one polymer, at least one inorganic filler. Preferably, the inorganic filler is present in an amount of from 30 to 70% by weight, more preferably from 35 to 55% by weight, with respect to the total weight of the polymeric material.

The inorganic filler may be selected from: hydroxides, oxides or hydrated oxides, salts or hydrated salts, e.g. carbonates or silicates, of at least one metal, particularly of calcium, magnesium or aluminium. Preferred are: magnesium hydroxide, aluminium hydroxide, aluminium oxide, alumina trihydrate, magnesium carbonate hydrate, magnesium carbonate, or mixtures thereof. Magnesium hydroxide either of synthetic or of natural origin (brucite) is particularly preferred.

With the aim of improving compatibility between inorganic filler and polymeric material, a coupling agent can be added either in the material or onto the organic filler or both. This coupling agent can be selected from: saturated silane compounds or silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters.

Preferred silane compounds suitable for this purpose are: γ-methacryloxypropyl-trimethoxysilane, methyltriethoxysilane, methyltris (2-methoxyethoxy)silane, dimethyldiethoxysilane, vinyltris (2-methoxyethoxy)-silane, vinyltrimethoxysilane, vinyl-triethoxysilane, octyltriethoxysilane, isobutyl-triethoxysilane, isobutyltrimethoxysilane and mixtures thereof.

Preferred epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether, or mixtures thereof.

Preferred monocarboxylic or dicarboxylic acids, having at least one ethylenic unsaturation, or derivatives thereof, as coupling agents are, for example: maleic acid, maleic anhydride, stearic acid, fumaric acid, citraconic acid, itaconic acid, acrylic acid, methacrylic acid and the like, and anhydrides or esters derived therefrom, or mixtures thereof. Maleic anhydride is particularly preferred.

Other conventional components such as antioxidants, processing coadjuvants, lubricants, pigments, other fillers and the like can be added to the buffer polymeric material of the present invention.

Other processing co-adjuvants possibly added to the polymer material are, for example, calcium stearate, zinc stearate, stearic acid, paraffin wax, silicone rubbers and the like, or mixtures thereof.

Preferably, at least one reinforcing element is embedded into the polymeric sheath and disposed along the length of the cable, so as to reduce mechanical stresses on the optical fibres due to tensile forces. Usually the reinforcing element is made from a glass reinforced polymer (GRP) rod or from an aramid rod.

Steel or aluminium tapes or other protecting elements known in the field of telecommunication cables may be present.

The buffered optical fibre according to the present invention may be produced according to known techniques. For example, the manufacturing process may be carried out in two steps, the first one comprising the sub-steps of drawing the optical waveguide and coating it with at least one protective coating. At the end of this first step the resulting unbuffered optical fibre is collected onto a reel and fed to the second step. The second step comprises the deposition of the tight buffer layer, which is usually obtained by extrusion of the polymeric material around the optical fibre by means of a cross-head extruder.

Preferably, the telecommunication cable according to the invention is equipped with from 12 to 48 optical fibres.

In another aspect, the present invention relates to a buffered microstructured optical fibre. As "buffered" it is herein meant an optical fibre provided with a tight buffer layer.

The microstructured optical fibre according to the present invention generally comprises a core region and a cladding region surrounding the core region, the cladding region comprising an annular void-containing region comprised of randomly arranged voids, and the core region including doped silica to provide a positive refractive index relative to pure silica, e.g. germania doped silica. The combination of features of core region and cladding region provides improved bend resistance and single mode operation at wavelengths above 1250-1260 nm. Hereinafter, the core region and the cladding region could be collectively referred to as optical waveguide.

In a preferred embodiment, the microstructured optical fibre of the cable of the invention has a void-containing annular region at a predetermined radial distance from the core. This radial distance is mainly determined by the radial width of the inner cladding layer.

A geometrical parameter that represents the radial distance from the low-density ring to the core is the core-to-clad diameter ratio. In general, larger values of core-to-clad ratio correspond to smaller radial distances from the annular region to the outer radius of core. Applicant has noted that a core-to-clad ratio of more than about 0.36, for instance equal to 0.40-0.43, would present advantages in the preform manufacturing.

Applicant has understood that a parameter relating the geometrical characteristics of the optical fibre with some of its optical performances is the ratio between the inner diameter (ID) of the annular region (see e.g., FIG. 7, ID=2IR) and the MFD, hereafter referred to as ID/MFD.

The optical mode propagating along the fibre is by large confined in the cross-sectional area of the core and evanescent tails of the mode may extend in the surrounding cladding layers. The shape of the optical mode and the portion and penetration depth of the mode evanescent tails depend, besides from the propagation wavelength, on refractive index of the core relative to the cladding (e.g., $\Delta_1$ in FIG. 7). In general, for single-mode transmission fibres, it may be advantageous not to exceed values of $\Delta_1$ larger than 0.4-0.5%, and thus, at the operational wavelengths of interest in the telecommunications (e.g., 1550 nm or 1310 nm), the evanescent tails of the fundamental optical mode generally penetrate to some extent into the cladding layers surrounding and in proximity of the core.

Applicant has found that, if the ID/MFD ratio is sufficiently high, the presence of voids significantly affects the optical properties of the fibre only in the presence of a bend, as the fundamental optical mode penetrates the void-containing region principally only along the curved portions of the fibre. A sufficiently high value of ID/MFD implies a radial distance of the void-containing annular region from the core sufficiently large so that the fundamental optical mode can propagate essentially unperturbed along the straight portions of the fibre, whereas it remains confined by the voids in the annular region along the bended portions of the fibre, due to the drop created by the voids in the refractive index.

The ratio ID/MFD is comprised between 2.5 and 3.2. In some preferred embodiments, the ratio ID/MFD is comprised between 2.6 and 3.0.

Preferably, the core-to-clad ratio is comprised between 0.31 and 0.36.

Preferably, the MFD is comprised between 8 μm and 9 μm, preferably between 8.2 μm and 8.8 μm.

Preferably, average void length is less than 1 meter, preferably less than 50 cm. In an embodiment, the average void length is of about 10 cm.

Preferably, the optical fibre according to the invention is a single-mode optical fibre. Alternatively, the optical waveguide may be of the multimodal type.

The optical waveguide is preferably surrounded by a coating system including at least one coating, usually two coatings. The first coating (primary coating) directly contacts the optical waveguide, while the second coating (secondary coating) overlies the first one.

Preferably, the optical waveguide has a diameter of from 120 μm to 130 μm. Preferably, the primary coating has a thickness of from 25 μm to 35 μm. Preferably the secondary coating has a thickness of from 10 μm to 30 μm.

According to a preferred embodiment, the optical waveguide has a diameter of from 120 μm to 130 μm, the primary coating has a thickness of from 18 μm to 28 μm, more preferably from 22 μm to 23 μm, and the secondary coating has a thickness of from 10 μm to 20 μm.

Preferably, the optical fibre before application of the tight buffer has a diameter of from 160 to 280 μm, more preferably from 175 to 260 μm, more preferably from 240 μm to 250 μm.

In a buffered microstructured optical fibre of the invention, a tight buffered layer having an ultimate elongation equal to or lower than 200% is provided to surround the coating system in direct contact thereto.

BRIEF DESCRIPTION OF THE DRAWINGS

Further characteristics will be apparent from the detailed description given hereinafter with reference to the accompanying drawings, in which:

FIGS. 3a-3c show perspective view of telecommunications cables according to different embodiments of the invention;

DETAILED DESCRIPTION OF THE PREFERRED EMBODIMENTS

Figure 1:
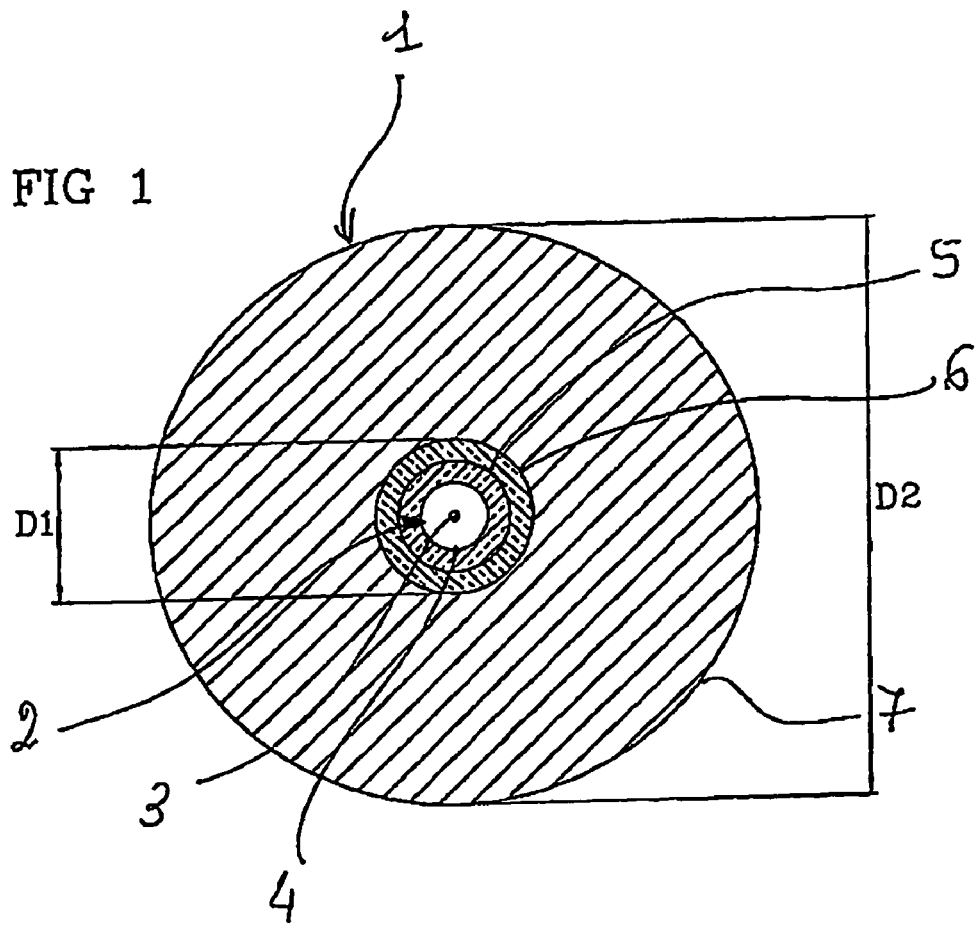
FIG. 1 is a cross-sectional view of an optical fibre with a protecting layer according to the present invention.

With reference to FIG. 1, a microstructured optical fibre 1 according to the present invention comprises an optical waveguide 2 constituted by a light-transmitting core 3 surrounded by a cladding 4. The core 3 and cladding 4 are preferably made of a silica-based material, the material of the cladding 4 having a refraction index lower than the refraction index of the core 3 and a low density region (not illustrated) as will be disclosed in the following.

The optical waveguide 2 is preferably surrounded by at least one coating, usually by two coatings 5, 6. The first coating 5 (primary coating) directly contacts the optical waveguide 2, while the second coating 6 (secondary coating) overlies the first one 5. The buffer layer 7 is surrounding the optical fibre directly in contact with the secondary coating 6.

Typically, the first and second coatings 5, 6 are made from radiation curable coating compositions comprising radiation curable oligomers which are compatible one with the other, but with different properties. For example, a soft primary coating 5, usually having an elastic modulus of about 1-2 MPa, surrounds the optical waveguide 2, while a relatively rigid secondary coating 6, usually having an elastic modulus of about 500-1000 MPa, surrounds the primary coating 5. For instance, the radiation curable oligomers may have a backbone derived from polypropylenglycol and a dimer acid based polyester polyol. Preferably, the oligomer is a urethane acrylate oligomer comprising said backbone, more preferably a fully aliphatic urethane acrylate oligomer.

For example, the first coating 5 is made from a radiation curable composition comprising a radiation curable oligomer as disclosed in International patent application WO 01/05724. For the second coating 6 a formulation sold under the trade name DeSolite™ 3471-2-136 (by DSM) may be used.

The coatings 5, 6 usually include an identifying means, such as an ink or other suitable indicia for identification.

In FIG. 1, with D1 it is indicated the diameter of the optical fibre before application of the tight buffer. As indicated hereinabove, D1 has preferably a value of from 160 μm to 280 μm, more preferably from 175 μm to 260 μm, even more preferably from 240 μm to 250 μm.

In FIG. 1, with D2 it is indicated the diameter of the optical fibre after application of the tight buffer. As indicated hereinabove, D2 has preferably a value of from 600 μm to 1000 μm, more preferably from 800 μm to 900 μm.

Figure 2:
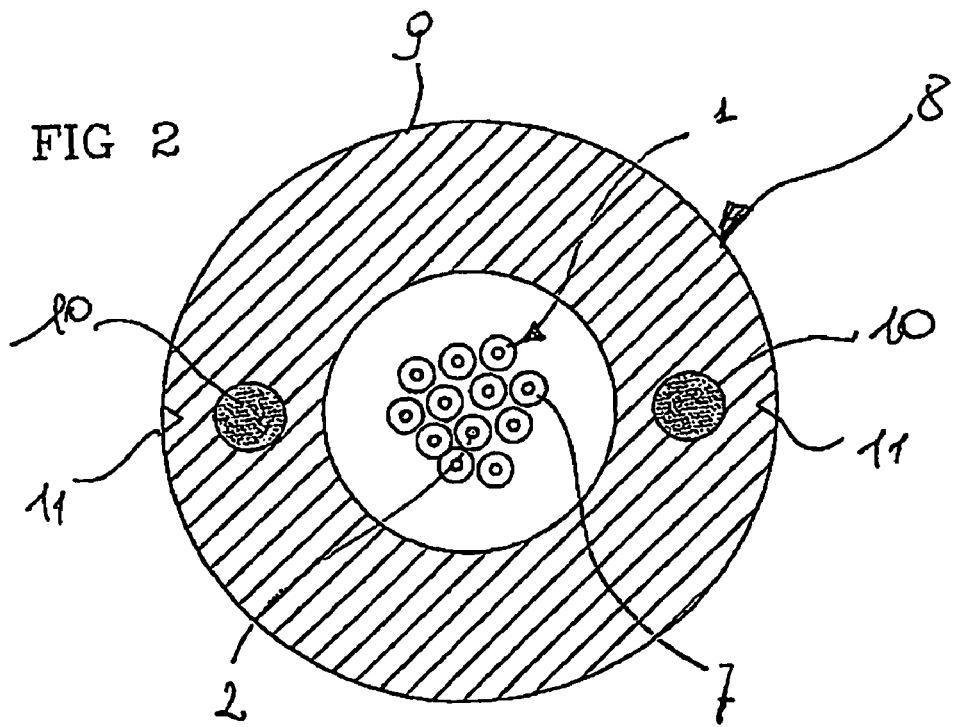
FIG. 2 is a cross-sectional view of a telecommunication cable according to the present invention.

With reference to FIG. 2, a telecommunication cable 8 according to the present invention comprises a plurality of buffered optical fibres 1 loosely disposed into the internal space of a polymeric tube 9. In FIG. 2, two reinforcing elements 10 are embedded into the polymeric tube 9 running along the longitudinal development of the cable. The reinforcing elements 10 may be made from a glass reinforced polymer (GRP) rod or an aramid rod. In correspondence of each reinforcing element 10, a notch 11 may be present which runs longitudinally on the external surface of the polymeric tube 9. The notch may be useful to the installer for identifying the position of the at least one reinforcing element optionally present so as to avoid the cutting of such element in the process of accessing to the optical fibres contained within the cable sheath.

Preferably, the free space between the polymeric tube 9 and the buffered optical fibres 1 may contain a sliding aid for pulling the optical fibres, for example talc.

As from FIGS. 3a-3b, a microstructured fibre 301 can be coated with a tight buffer layer 302, made of a polymeric material suitable to provide mechanical protection. The so-built buffered optical fibre 303 is surrounded by a reinforcing layer 304 (for example made of aramid fibres) and an outer sheath 305, as shown in FIG. 3a, or more strength layers 304a, 304b and sheaths 305a, 305b, as shown in FIG. 3b.

Figure 3C:
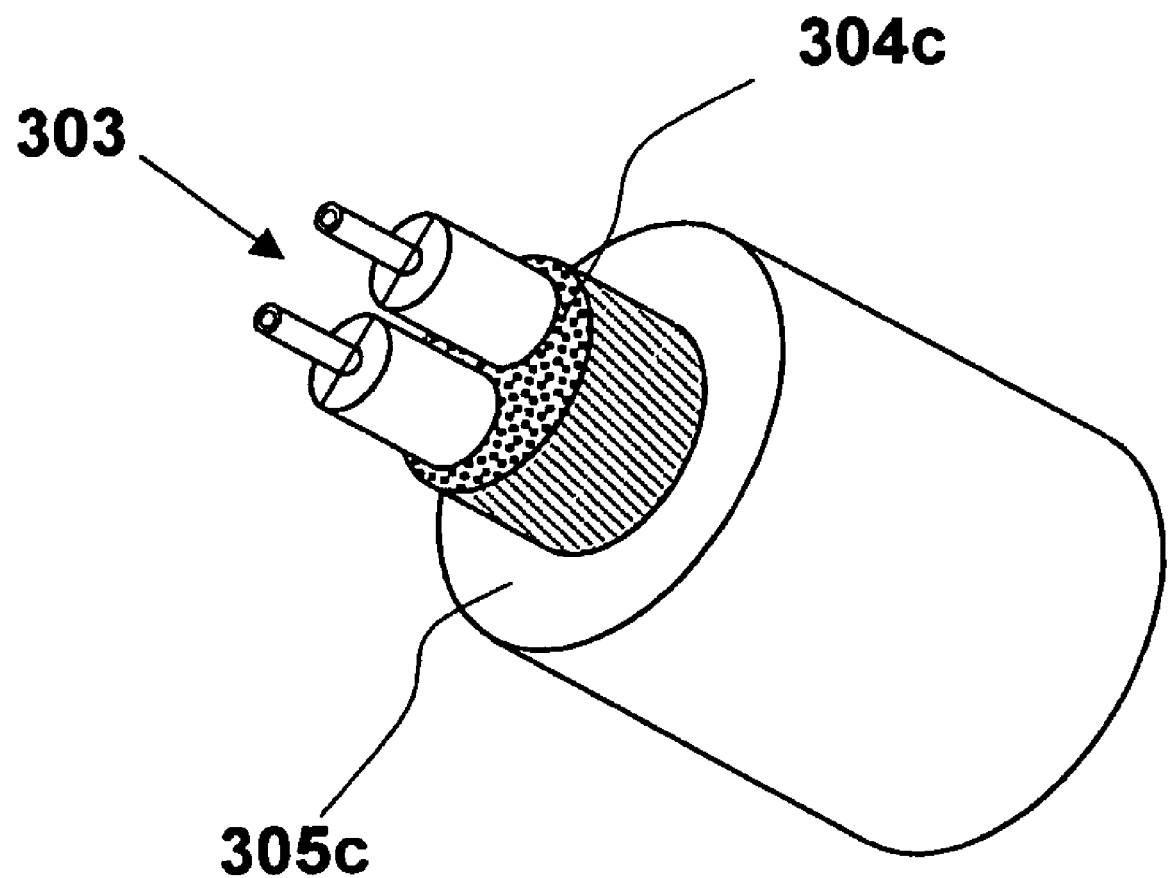

In another example, two buffered fibres 303 are arranged within a common strength layer 304c surrounded by a sheath 305c, as from FIG. 3c.

Such constructions (or others, depending on the intended environment of use of the microstructured optical fibre) provide the required mechanical protection to the optical fibre for in the installation process and in the operation thereof.

In particular, for use within buildings, such as private houses or offices, the fibre (or better, the cable housing the fibre) is required to follow complex paths which include bends around corners.

Figure 4:
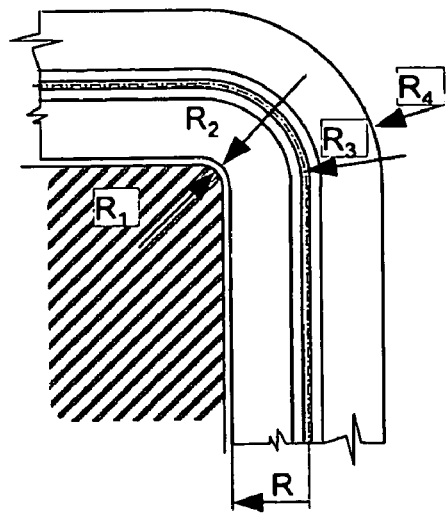
FIGS. 4 to 6 relates to examples of cable installation.

Usually, a corner in a building is made of materials which do not allow too sharp edges, as it would be in case of a metal construction. Accordingly, as from FIG. 4, when the cable is bent around a corner (e.g. a 90° angle) the edge of the corner is rounded by a radius $R_1$, which corresponds to an inner bending radius $R_2$ of the cable sheath (equal or larger than $R_1$), a bending radius of the fibre $R_3$ and a bending radius $R_4$ of the outer portion of the cable sheath.

While bending, it can be assumed that the neutral axis (i.e. the axis with zero elongation) is coincident with the optical fibre axis (this is a preferred cable construction, intended to minimize the stress in the fibre). Accordingly, the inner portion of the sheath will be compressed and the outer portion of the sheath will be stretched by amounts depending on the radius around which the cable is bent.

From a pure geometrical point of view, in case of bending around a 90° angle, if the corner radius $R_1$ would be equal to zero (sharp edge) and the inner bending radius of the cable sheath $R_2$ would equally be zero, the maximum elongation of the outer portion of the cable sheath $R_4$ would be 100% (if the fibre path in the bent portion is $\frac{1}{2}\pi R$—being R the radius of the cable—the outer sheath side length would become $\frac{1}{2}\pi \cdot 2R$).

Figure 5:
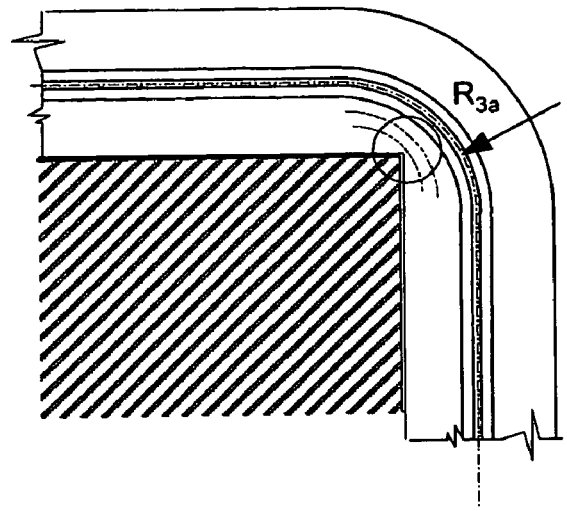
Figure 6:
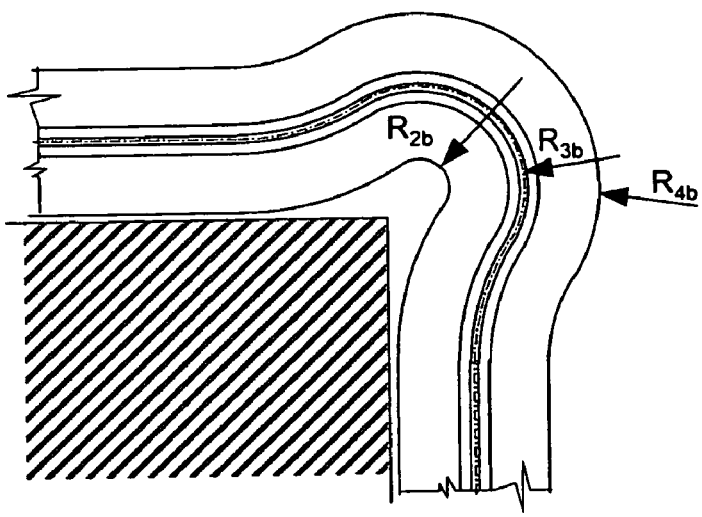
Figure 7:
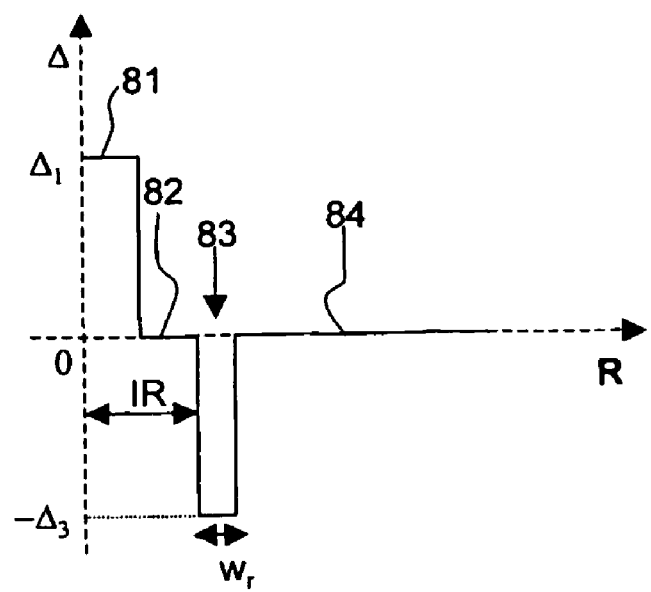
FIG. 7 is a schematic diagram of a possible relative refractive index profile of a microstructure optical fibre for the cable of the invention.

In the real world, a bend around a sharp corner would imply a more complex deformation of the cable, including a certain amount of elongation of the fibre and a transversal deformation of the sheath, as shown in FIG. 5, which results in a bending radius $R_{3a}$ along the neutral axis larger than the cable radius R. Alternatively, in case the sheath does not accept significant amounts of transversal compression, the cable may form a more complex bend figure, as shown in FIG. 6, where a minimum inner bending radius $R_{2b}$ causes the bending radius of the neutral axis (i.e. along the fibre axis) to become suitably larger (namely $R_{3b}=R_{2b}+R$). The outer bending radius $R_{4b}$ and the relevant elongation will be correspondingly larger.

The possibility of obtaining a bending path as shown in FIG. 5 or 6 (or any intermediate combination) depends mainly on the stiffness of the sheath material, so that higher compression amounts would be allowed.

The same discussion above applies when the buffered fibre alone is used to reach the final user in the building, i.e. a fibre with a buffer layer, or when a certain amount of excess length is stored in a small coil adjacent to a splice, connector or the like, so that the same degree of elongation percent is applied to the buffer layer.

Because of the small radius of the buffer layer (e.g. 600-900 micrometers) this condition of use implies a smaller bending radius of the fibre when it is bent around a corner (which would still be compatible with the optical performance of the microstructured fibre).

However, it has been observed that the optical performance of the fibre is not the only element to be taken into account. When a cable or buffered fibre is bent around a corner for installation within a building or coiled on a small diameter, the fibre housed therein is maintained at the corresponding bending value for the cable life and this permanent deformation status can be source of unexpected mechanical breaks of the fibre (this phenomenon being generally addressed as "static fatigue"). Accordingly, even with fibres showing excellent optical performances in bent conditions, the minimum bending radius should be limited for mechanical reasons.

In addition, minimizing the inner bending radius $R_2$ requires a "soft" material i.e. a material with very high compressibility, (or low elastic modulus), such as polyurethane or the like (either for the sheath or the buffer layer).

In view of the relatively high elongation undergone by the sheath during the cable bending, a material having high elongation at break seemed also desirable.

Typically, materials having low elastic modulus have also a very high elongation at break.

However, it has been observed that there are uses where a sheath, or a buffer layer, having a high elongation at break and low elastic modulus materials turns out to be a problem.

In particular, during the installation of a cable in a building it is typical to be in the need of peeling off the sheath or the fibre buffer layer, in order to apply a connector to the fibre, to make a mechanical splice, or a butt welding of the fibre or the like.

In such circumstances, a highly stretchable material would require some special tools to peel of the relevant layer, and an improper use of such tool may result in mechanical stress applied to the fibre.

To the contrary, a relatively stiffer material, with a low elongation at break allows the operator to peel off the buffer layer with the fingers or with a simple tool, with practically no stress applied to the fibre.

In the above, it has been found that, in order to make an optical fibre or a cable suitable for use in the so-called FTTH applications, a number of different properties have to be considered together, including low attenuation in bent conditions, ability to resist to static fatigue, ease of installation and connectorization.

Accordingly, it has been found that a convenient fibre for FTTH application should be a microstructured optical fibre, protected by a buffer layer or a cable sheath whose elongation at break is comprised in a suitable range enabling bending around relatively sharp edges ad, at the same time, enabling manual peeling off of the buffer layer.

In particular, it has been found that a relatively high ultimate elongation would be of no use in a cable or buffered fibre for FTTH applications, given the fact that the cable or buffered fibre bending conditions never reach the maximum theoretical elongation of 100% and, to the contrary, always remain well below such value.

It has been observed that, for microstructured fibres with a core-to-clad ratio of about 0.40 or larger, light transmission exhibit a significant OH-peak at about 1380-1390 nm, which worsen the optical performances of the fibre, especially by increasing the attenuation of the propagating optical mode.

Figure 8:
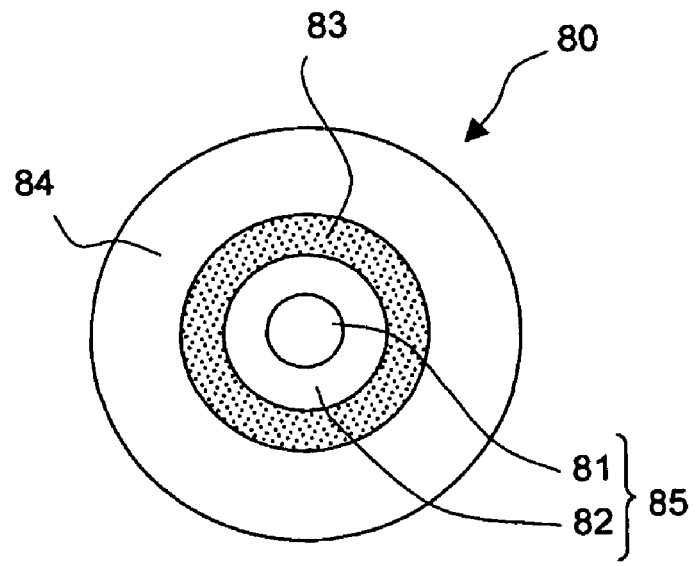
FIG. 8 schematically illustrates a cross-section of a microstructured optical fibre of the invention.

FIG. 8 schematically illustrates a cross-section of a microstructured optical fibre 80 comprising a core region 85 formed by a core 81 and an inner cladding layer 82 surrounding the core 81. Core region 85 is surrounded by an outer cladding region 84 that includes a void-containing annular region (ring) 83. Ring 83 is preferably arranged in proximity of the inner cladding 82 such that the inner diameter (ID) of the annular region 83 corresponds to the outer diameter of the inner cladding layer 82. Voids are distributed across ring 83 in a non-periodic or random arrangement. Preferably, the core region 84 is solid, i.e., void-free.

Figure 9:
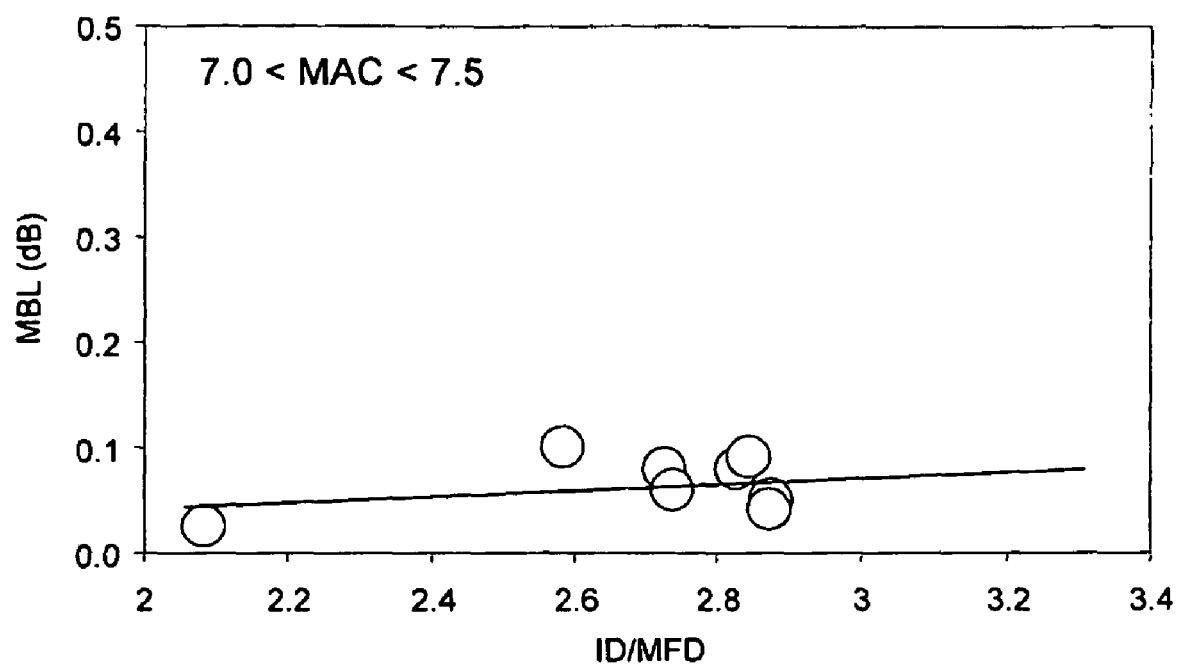
FIG. 9 is a plot the macrobending loss as a function of the ratio between the inner diameter ID of the void-containing annular region and the MFD for optical fibres, ID/MFD, (circles) exhibiting a MAC number from 7.0 to 7.5.

FIG. 9 is a plot the macrobending loss as a function of the ratio between the inner diameter ID of the void-containing annular region and the MFD for optical fibres, ID/MFD, (circles) exhibiting a MAC number from 7.0 to 7.5. Solid line is a linear interpolation of the experimental values.

Notably, results reported in FIG. 9 indicate that the macrobending loss is basically independent of the ratio ID/MFD, within a large range of values of ID/MFD.

Therefore, advantageously, the optical fibre according to an aspect of the present invention has optical transmission characteristics substantially lacking in the water-related attenuation peaks while exhibiting macrobending loss significantly less than 1 dB, e.g. less than 0.5 dB, preferably less than 0.2 dB.

In some embodiments, voids have an average diameter of 1 the smallest diameter being of about 0.1 μm and the largest diameter being of about 1.9 μm.

The following working examples are given to better illustrate the invention, but without limiting it.

EXAMPLE 1

Preparation of a Polymeric Composition

A polymeric composition was prepared by using the components as shown in Table 1 (the amounts are expressed as % by weight with respect to the total weight of the polymeric composition).

TABLE 1

| Component | wt % |
| --- | --- |
| Copolymer ethylene-butyl acrylate | 37.3 |
| Low density polyethylene | 10.1 |
| Ethylene vinyl acetate | 3.0 |
| Magnesium hydroxide | 47.2 |
| Processing aid | 2.4 |

The composition was prepared by mixing the components as shown in Table 1 in a closed mixer. The mixtures were then granulated and the obtained granules were used for manufacturing a tight buffer layer for the cable of the invention.

The above polymeric composition was characterized as follows:
ultimate elongation: 136% (measured on a plate);
ultimate tensile strength: 8.0 MPa (measured on a plate);
modulus at 50% 7.0 MPa (measured on a plate).

The so obtained buffered optical fibre had an external diameter of 900 μm.

The following measurements were made on the buffered optical fibre (mean values calculated from nine tested samples):
average strip force: 0.22 N/15 mm (measured according to FOTP/184/TIA/EIA standard carried out at a stripping speed of 10 mm/min);
peak strip force: 1.84 N/15 mm (measured according to FOTP/184/TIA/EIA standard carried out at a stripping speed of 10 mm/min);
friction coefficient between buffer and optical fibre: 0.27.

Said friction coefficient was measured as follows. The buffered optical fibre has been wrapped around a mandrel; one optical fibre end (free from the buffer layer) is connected with a load cell; the other optical fibre end (free from the buffer layer) is connected with a weight; the load cell measures the force necessary to move 50 mm of optical fibre through the buffer coating. Test set up:
mandrel diameter: 315 mm
weight (P)=1 N
Pulling speed=500 mm/min
α=5/2α(1+¼ round)

Hereinbelow the formula for the calculation of the friction coefficient is provided $$T=P*e^{f\alpha}$$

wherein T is the force measured by the load cell; P is the applied weight; f is the friction coefficient and α is the wrapping angle. Thus, the friction coefficient was determined according to:

$$f = \frac{LN(T/P)}{\alpha}$$

EXAMPLE 2

Manual Stripping Test

Five buffered optical fibres according to the invention coming from different production batches were employed for the test. The buffer layers were manually stripped-off the fibres by the same operator at increasing lengths starting from 10 cm. All of the five optical fibres were easily deprived of the buffer thereof until a length of 50 cm. At a length of 90 cm the buffer of two optical fibres could not be stripped off. For the remaining three, the coherence between buffer and optical fibre (impeding the buffer stripping-off) was reached at 120 cm (two fibres) and 130 cm (one fibre).

EXAMPLE 3

Preparation of a Polymeric Composition

A polymeric composition was prepared by using the components as shown in Table 2 (the amounts are expressed as % by weight with respect to the total weight of the polymeric composition).

TABLE 2

| Component | wt % |
| --- | --- |
| Ethylene vinyl acetate | 29.7 |
| Low density polyethylene | 5.2 |
| Alumina trihydrate | 62.9 |
| Additives | 2.1 |

The composition was prepared by mixing the components as shown in Table 2 in a closed mixer. The mixtures were then granulated and the obtained granules were used for manufacturing a sheath for the cable of the invention.

The above polymeric composition was characterized as follows:
ultimate elongation: 164.3% (measured on a plate);
ultimate tensile strength: 12.7 MPa (measured on a plate);
modulus at 50% 10.5 MPa (measured on a plate).
modulus at 150% 12.7 MPa (measured on a plate).

The invention claimed is:
1. A telecommunication cable comprising:
at least one microstructured optical fibre comprising a core region and a cladding region surrounding the core region, the cladding region comprising an annular void-containing region comprised of randomly arranged voids, the core region comprising doped silica to provide a positive refractive index relative to pure silica;

at least one coating layer surrounding said optical fiber; and at least one protecting layer provided around and substantially in contact with said at least one coating layer, the at least one protecting layer being a tight buffer layer made of a polymeric material having a composition resulting in an ultimate elongation of 50% to 200% and an average stripping force of from 0.10 N/15 mm to 0.50 N/15 mm.

2. The telecommunication cable according to claim 1, wherein the tight buffer layer is made from a polymeric material having an ultimate elongation equal to or lower than 150%.

3. The telecommunication cable according to claim 2, wherein the polymeric material of the tight buffer layer has an ultimate elongation of 70% to 150%.

4. The telecommunication cable according to claim 1, comprising at least two protecting layers comprising a tight buffer layer and at least one sheath.

5. The telecommunication cable according to claim 4, wherein the at least one sheath has an ultimate elongation higher than the elongation of the tight buffer layer.

6. The telecommunication cable according to claim 4, wherein the at least one sheath is made from a polymeric material having an ultimate elongation of 120% to 200%.

7. The telecommunication cable according to claim 6, wherein the polymeric material has an ultimate elongation of 150% to 200%.

8. The telecommunication cable according to claim 4, comprising at least two sheaths.

9. The telecommunication cable according to claim 1, comprising at least one reinforcing layer.

10. A buffered microstructured optical fibre comprising a core region having a positive refractive index relative to pure silica and a cladding region surrounding the core region, comprising an annular void-containing region comprised of randomly arranged voids; a coating system; and a tight buffer layer having a composition resulting in an ultimate elongation of 50% to 200% and an average stripping force of from 0.10 N/15 mm to 0.50 N/15 mm surrounding the coating system in direct contact therewith, said optical fibre having a core-to-clad diameter ratio greater than 0.30.

11. The buffered microstructured optical fibre according to claim 10, wherein the core-to-clad diameter ratio is 0.31 and 0.36.

12. The buffered microstructured optical fibre according to claim 10, comprising an annular region with an inner diameter and a mode field diameter measured at 1310 nm, in microns, such that a ratio of the inner diameter/mode field diameter is between 2.5 and 3.2.

13. The buffered microstructured optical fibre according to claim 12, wherein the ratio of the inner diameter/mode field diameter is between 2.6 and 3.0.

* * * * *